(12) United States Patent
Reynolds (10) Patent No.: US 10,513,753 B1
(45) Date of Patent: Dec. 24, 2019

(54) SYSTEMS, METHODS, AND CORED WIRES FOR TREATING A MOLTEN METAL

(71) Applicant: 2498890 Ontario Inc., Palmerston (CA)

(72) Inventor: Mark Reynolds, Palmerston (CA)

(73) Assignee: 2498890 Ontario Inc., Palmerston (CA)

( * ) Notice: Subject to any disclaimer, the term of this patent is extended or adjusted under 35 U.S.C. 154(b) by 0 days.

(21) Appl. No.: 16/257,289

(22) Filed: Jan. 25, 2019

Related U.S. Application Data (60) Provisional application No. 62/787,786, filed on Jan. 3, 2019.

(51) Int. Cl.
| | | |
|---|---|---|
| C22B 21/06 | (2006.01) |
| C22B 9/10 | (2006.01) |
| C21C 7/00 | (2006.01) |
| B22D 11/108 | (2006.01) |
| B21F 23/00 | (2006.01) |
| B23K 35/02 | (2006.01) |
| B23K 35/36 | (2006.01) |

(52) U.S. Cl.
CPC ............ *C22B 21/064* (2013.01); *B21F 23/00* (2013.01); *B21F 23/002* (2013.01); *B22D 11/108* (2013.01); *B23K 35/0277* (2013.01); *B23K 35/3603* (2013.01); *C21C 7/0056* (2013.01); *C22B 9/10* (2013.01); *C22B 9/103* (2013.01)

(58) Field of Classification Search
CPC ......... C22B 21/062; C22B 9/10; C22B 9/103; C21C 7/0056; B22D 11/108; B23K 35/3603; B23K 35/0277; B23K 35/406; B21F 23/00; B21F 23/002
See application file for complete search history.

(56) References Cited

U.S. PATENT DOCUMENTS

| | | | | |
|---|---|---|---|---|
| 4,247,324 A | * | 1/1981 | Guarino | C21C 7/06 266/216 |
| 4,364,770 A | * | 12/1982 | Douchy | B23K 35/0277 75/304 |
| 4,711,663 A | * | 12/1987 | Ferrari | C22B 9/103 420/129 |

(Continued)

FOREIGN PATENT DOCUMENTS

| | | | |
|---|---|---|---|
| CN | 106756143 A | * | 5/2017 |
| CN | 107385225 A | | 11/2017 |

(Continued)

OTHER PUBLICATIONS

CN 106756143 A human translation (Year: 2017).*

*Primary Examiner* — Tima M. McGuthry-Banks
(74) *Attorney, Agent, or Firm* — Own Innovation; James W. Hinton (57) ABSTRACT

Systems, methods, and apparatus for treating a molten metal are provided. A metal treatment system, comprising: a wire feeding subsystem; and a cored wire; wherein the wire feeding subsystem feeds the cored wire into a metal bath at a controlled wire feed rate, and wherein the metal bath comprises a molten metal; wherein the cored wire comprises: a consumable outer sheath having a tubular cross section; and a core fill material coupled to an inner surface of the outer sheath, wherein the core fill material comprises a refining agent for refining the molten metal; and wherein the refining agent reacts with the molten metal, thereby causing an impurity to be removable from the metal bath.

21 Claims, 5 Drawing Sheets

(56) References Cited

U.S. PATENT DOCUMENTS

| | | | |
|---|---|---|---|
| 4,880,462 A * | 11/1989 | Meyer-Grunow | C22C 1/026 |
| | | | 75/304 |
| 5,405,427 A | 4/1995 | Eckert | |
| 6,602,318 B2 | 8/2003 | Bilodeau et al. | |
| 6,755,889 B2 | 6/2004 | Bilodeau et al. | |
| 8,025,712 B2 | 9/2011 | Dupuis et al. | |
| 8,282,704 B2 * | 10/2012 | Poulalion | B21F 1/02 |
| | | | 75/414 |
| 2002/0096810 A1 | 7/2002 | Bilodeau et al. | |
| 2003/0196518 A1 | 10/2003 | Bilodeau et al. | |
| 2008/0307927 A1 | 12/2008 | Dupuis et al. | |
| 2014/0083253 A1 | 3/2014 | Lutes et al. | |

FOREIGN PATENT DOCUMENTS

| | | |
|---|---|---|
| CN | 108130440 A | 6/2018 |
| EP | 0066305 A1 | 12/1982 |
| EP | 0546351 A3 | 12/1993 |
| FR | 2796398 A1 | 1/2001 |
| JP | 2004292941 A | 10/2004 |
| JP | 2009512782 | 3/2009 |
| JP | 2010527410 | 8/2010 |
| KR | 101553485 B1 | 9/2015 |
| WO | WO 2005103335 * | 11/2005 |
| WO | 2008009414 A1 | 1/2008 |
| WO | 2008031473 A1 | 3/2008 |
| WO | 2014190430 A1 | 12/2014 |

* cited by examiner

SYSTEMS, METHODS, AND CORED WIRES FOR TREATING A MOLTEN METAL

TECHNICAL FIELD

The following relates generally to metal treatment and refining, and more specifically to systems, methods, and cored wires for treating a molten metal with a refining agent.

INTRODUCTION

Impurities in a molten metal (e.g. aluminum) such as non-metallic inclusions and hydrogen can adversely affect the mechanical, physical, and chemical properties of metal products made from the molten metal, such as metal castings. Adversely affected properties may include strength, electrical and thermal conductivity, corrosion resistance, and the like. The removal or reduction of such impurities in molten metals is an important part of a casting line or casting process. It is preferred that refining of the molten metal be carried out before it is poured into a mould cavity or other such step.

Impurity reduction performance requirements are increasing. Increases in impurity reduction performance requirements may be driven by demands for high value added-product in various fields of application. Demands may be particularly high in fields with high standards of quality control, such as aerospace and automotive.

Various systems and approaches exist for removing or reducing impurities in a molten metal. However, existing systems, such as salt-injection systems, may not provide sufficient precision and repeatability, particularly when it comes to the provision of the refining agent.

Accordingly, there is a need for an improved metal treatment system and method that overcomes at least some of the disadvantages of existing or conventional metal treatment systems.

SUMMARY

Other aspects and features will become apparent, to those ordinarily skilled in the art, upon review of the following description of some exemplary embodiments.

A metal treatment system is provided herein. The metal treatment system includes a wire feeding subsystem and a cored wire. The wire feeding subsystem feeds the cored wire into a metal bath at a controlled wire feed rate. The metal bath includes a molten metal. The cored wire includes a consumable outer sheath having a tubular cross section and a core fill material coupled to an inner surface of the outer sheath. The core fill material includes a refining agent for refining the molten metal. The refining agent reacts with the molten metal, thereby causing an impurity to be removable from the metal bath.

The molten metal may be aluminum.
The refining agent may be a salt.
The salt may be a eutectic salt.
The salt may be a chloride salt.
The salt may be a binary salt including $MgCl_2$.
The binary salt may include KCl or NaCl.
The salt may be a tertiary salt mix.
The tertiary salt mix may include aluminum fluoride or potassium aluminum fluoride.
The impurity may be hydrogen gas, a non-metallic inclusion, or an alkali metal.
The non-metallic inclusion may be an oxide, a boride, or a carbide.

The alkali metal may be sodium, lithium, or calcium.

A metal treatment method is provided herein. The metal treatment method includes providing a metal bath including a molten metal. The method also includes feeding a cored wire into the metal bath at a controlled wire feed rate. The cored wire includes a consumable metal sheath having a tubular cross section and a core fill material coupled to an inner surface of the sheath. The core fill material includes a refining agent for refining the molten metal. The method also includes reacting the refining agent with the molten metal, thereby causing an impurity in the molten metal to be removable from the metal bath.

The method may include monitoring the amount of refining agent added to the molten metal.

A cored wire for refining a molten metal is provided herein. The cored wire includes a consumable metal sheath comprising a tubular cross-section and a core fill material coupled to an inner surface of the tubular wire to form the cored wired. The core fill material includes a refining agent for refining the molten metal. The refining agent reacts with the molten metal, thereby causing an impurity to become removable form the molten metal.

The molten metal may be aluminum.
The refining agent may be a salt.
The salt may be a binary salt.
The salt may be a tertiary salt mix.
The cored wire may be used in a wire feeding subsystem adapted to feed the cored wire to the molten metal.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The following relates generally to metal treatment and refining, and more specifically to systems, methods, and cored wires for treating a molten metal with a refining agent. Systems and methods disclosed herein may be used as part of an in-line refining/metal treatment process to remove impurities. The impurities may include dissolved hydrogen, suspended non-wetted inclusions, and/or dissolved alkali metals.

Existing metal treatment systems include salt injection systems (e.g. rotary gas injection system), electromagnetic pumps, in-line degassers (e.g. box degasser, trough degasser), flux injectors, portable flux and refining agent injection systems, and plungers. Existing metal treatment systems may have reaction efficiencies in a range of 20-60%. Existing metal treatment systems may not be adapted to provide a sufficiently precise feed of a refining agent to a molten metal. Existing metal treatment systems may suffer from imprecise feeding of refining agent due to the absence of an appropriate feedback or control mechanism on the feed.

Figure 1:
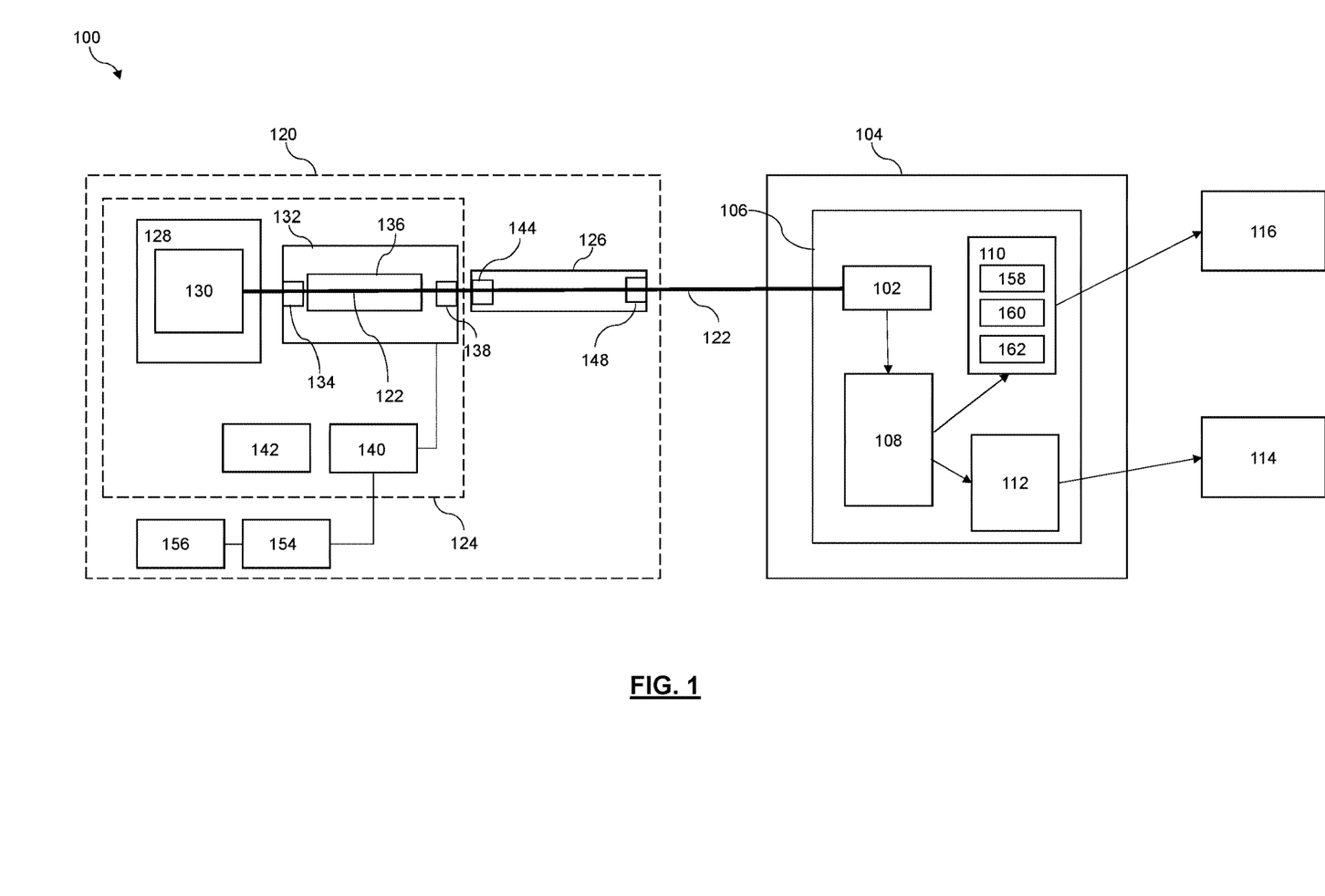
FIG. 1 is a schematic block diagram of a metal treatment system, according to an embodiment.

Referring now to FIG. 1, shown therein is a metal treatment system 100, according to an embodiment. The metal treatment system 100 can be used for refining a molten metal by the addition of a refining agent 102. In a particular case, the metal treatment system 100 can be used for the removal of one or more impurities from a molten aluminum.

The system 100 may be used as one part of a casting line. In this sense, the system 100 may be considered as one part of an overall melt quality package. For example, the system 100 may be positioned between a furnace treatment stage and a filtration stage in the casting line.

The system 100 includes a vessel 104. The vessel 104 holds a metal bath 106. The metal bath 106 includes the molten metal. The molten metal starts as an unrefined molten metal 108 including one or more impurities 110. By operation of the metal treatment system 100, the unrefined molten metal 108 is transformed into a refined molten metal 112 through the removal or separation of the impurities 110 from the molten metal. The refined molten metal 112 may be transferred to a downstream stage 114 of an overall in-line refining process/casting line.

The molten metal may be aluminum or an aluminum alloy. The alloy may be a high magnesium alloy. The alloy may be a high silicon alloy.

The unrefined molten metal 108 includes the impurities 110. The system 100 is designed to cause the impurities 110 to become removable from the metal bath 106 via the addition of a refining agent 102.

The vessel 104 may have a base and a plurality of sides. The vessel 104 may be connected to one or more upstream or downstream components, such as downstream stage 114, of the casting line or overall metal treatment process. The vessel 104 may include an upstream inlet for receiving the molten metal from an upstream or other source. The vessel 104 may include a downstream outlet for transferring the refined molten metal 112 to downstream stage 114.

The refining action of the system 100 may generate dross. The dross includes floating matter in the metal bath 106. The dross includes solid impurities 110 floating on the molten metal or dispersed in the molten metal. The dross may include unwanted material that forms on the surface of the molten metal during the refining/treatment process. The dross can be skimmed off the surface of the molten metal/metal bath 106. The dross may be skimmed by mechanical process or manually by an operator.

The vessel 104 may be connected to a dedrossing port 116. The dedrossing port 116 receives the dross from the metal bath 106. The dross may be processed separately or discarded.

The dimensions and composition of the vessel 104 may be designed to improve the refining process. The vessel 104 may be designed to allow the escape of gas into the local atmosphere, such as via an exposed surface. The vessel 104 may be designed to have an increased metal height and bubble residence time. Increased metal height or bubble residence time may be achieved via an increased vessel volume. Bubble residence time may be considered as the time during which a rising gas bubble in the metal bath 106 is in contact with the molten metal. Increasing the metal/gas residence time of the vessel 104 may increase process performance. The system 100 may be designed to influence a metal residence time and a bubble residence time (i.e. the time the bubbles are in contact with the metal as they rise to the melt surface). Influencing design criteria such as metal residence time and bubble residence time may increase the effectiveness of the degassing function of the system 100.

The system 100 includes a wire feeding subsystem 120. The wire feeding subsystem 120 feeds a cored wire 112 into the metal bath 106 for refining the unrefined molten metal 108. The cored wire 122 includes the refining agent 102.

The wire feeding subsystem 120 feeds the cored wire 122 into the metal bath 106 at a wire feed rate. The wire feed rate may be prespecified. The wire feed rate may be constant. The wire feed rate may be adjustable. The wire feed rate may be adjusted to feed more or less cored wire 122 (and thus refining agent 102) to the unrefined molten metal 108 per period of time.

The wire feeding subsystem 120 includes a wire feeder unit 124. The wire feeder unit 124 feeds the cored wire 122 to a wire conduit 126. In an embodiment, the wire feeding subsystem 120 may include a cold wire welding feeder adapted as necessary to deliver the cored wire 122. The wire feeding subsystem 120 may operate automatically, semi-automatically, or manually.

The wire feeding subsystem 120 mechanizes the addition of the refining agent 102 to the unrefined molten metal 108 via delivery of the cored wire 122. Mechanizing the delivery of the cored wire 122 may provide a consistent and/or controlled delivery of the cored wire 122, and thus the refining agent, to the metal bath 106.

The wire feeder unit 124 includes a wire store 128. The wire store 128 stores a wire supply 130 of the cored wire 122. The wire store 128 may be a spool or reel-type mechanism for holding the wire supply 130.

The wire feeder unit 124 includes a wire feed mechanism 132. The wire feed mechanism 132 may be connected to the wire store 128. The wire feed mechanism 132 transfers a portion/length of the wire supply 130 from the wire store 128 to the wire conduit 126.

The wire feed mechanism 132 includes an inlet 134 for receiving the cored wire 122 from the wire store 128. The inlet 134 guides the cored wire 122 into a feed roll assembly 136 of the wire feed mechanism 132. The wire feed mechanism 132 includes an outlet 138 for transfer of the cored wire 122 to the wire conduit 126. The outlet 138 may be continuous with an outlet of the wire feeder unit 124. The outlet 138 guides the cored wire 122 from the feed roll assembly 136 into the wire conduit 126 (for example, via a wire conduit inlet guide). The inlet 134 and outlet 138 may be designed to work with a range of sizes of cored wire 122.

The feed roll assembly 136 includes one or more feed rolls for conveying the cored wire 122 from the wire store 128 to the wire conduit 126.

The feed roll assembly 136 may include a drive roll. The drive roll may be for smooth wire feeding. The drive roll may promote smooth and consistent feeding of the cored wire 122. The drive roll may be dual grooved.

The drive roll may be a v-knurled drive roll or a u-groove drive roll. The v-knurled drive roll may include teeth to dig into the cored wire 122 and help push the cored wire 122 through the wire feeder unit 120 and wire conduit 126.

The u-groove drive roll may be suitable for cored wire 122 including aluminum or other soft materials. The u-groove drive roll may avoid marring the surface of the cored wire 122 or deforming or mashing the cored wire 122, which may be particularly when using a soft cored wire (e.g. including aluminum). The u-groove drive roll may feed the cored wire 122 while maintaining the shape of the cored wire 122 (e.g. round shape).

The design of the feed roll mechanism 144 may be selected based on one or more properties of the cored wire 122. The drive roll may be selected based on the size of the cored wire 122 (e.g. to match the size of the cored wire 122), to avoid feeding problems.

The drive roll may include a drive roll tension. The drive roll tension controls the tension of the drive roll. If the drive roll tension is set too tight, the cored wire 122 may be deformed, causing problems. If the drive roll tension is set too loose, the cored wire 122 may experience slippage.

The feed roll mechanism 144 may include a pressure roll. The pressure roll may be of a size and type suitable for the cored wire 122 being fed.

The wire feeder unit 120 includes a motor 140. The motor 140 may be a drive motor. The motor 140 supplies motive power to the wire feeding mechanism 132. The motor 140 may supply motive power to one or more additional components of the wire feeding subsystem 120.

The wire feeder unit 124 may include a potentiometer. The potentiometer may be configured to adjust the wire feed rate. The potentiometer may be a ten-turn potentiometer. The potentiometer may include a toggle switch for continuous or pulse wire feed operation. The wire feeder unit 124 may include a delay start control and a wire retract control for automatic operation.

The wire feeder unit 124 includes a power source 142. The power source 142 supplies power to one or more electrical components of the wire feeding subsystem 120, (e.g. motor 140, computing device 156).

The wire feeding subsystem 120 includes the wire conduit 126. The wire conduit 126 includes a first end 144 and a second end 146. The wire conduit 126 includes a length of material 148 that travels from the first end 144 to the second end 146 of the wire conduit 126.

The first end 144 is connectable to the wire feeder unit 124. The first end 144 includes a wire inlet 150 for receiving the cored wire 122 from the wire feeder unit 124. The first end 144 may include a coupling mechanism for connecting the wire conduit 126 to the wire feeder unit 124.

The second end 146 includes a wire outlet # for the cored wire 122 to exit the wire conduit 126. The cored wire 122 exits the wire conduit 126 via the wire outlet 152 and is delivered to the metal bath 106.

The wire conduit 126 may be a composed of a flexible material. The wire conduit 126 may have a circular cross-section and a tubular structure. The wire conduit 126 may be a closed/sealed length of material have a tubular cross-section. The wire conduit includes an outer material and an inner channel having dimensions sufficient to accommodate the cored wire 122. The wire conduit 126 has dimensions suitable to accommodate the cored wire 122. The wire conduit 126 may include a protective coating on an outer surface of the wire conduit 126.

The wire conduit 126 may be fitted with a conduit liner. The conduit liner may be replaceable. The conduit liner may be low-friction.

In an embodiment, the wire conduit 126 may be a feed cable. The feed cable may be similar in structure and function to a feed cable used with a cold wire welding feeder.

The wire conduit 126 guides the cored wire 122 from the wire feeder unit 124 to the metal bath 106. The wire conduit may have an internal surface composition that promotes movement of the cored wire 122 along the length of the wire conduit 126 as the cored wire 122 is fed along. For example, the internal surface of the wire conduit 126 may include a material or features that reduce friction between the cored wire 122 and the inner surface of the wire conduit 126.

The wire feeding subsystem 120 includes a control unit 154. The control unit 154 (or a portion thereof) may be housed in the wire feeder unit 124. The control unit 154 may include a solid-state control circuitry.

The wire feeding subsystem 120 includes a computing device 156. The computing device 156 includes a processor and a memory. The computing device 156 may be in communication with one or more components of the system 100. The computing device 156 may be in communication with the control unit 154. The computing device 156 may implement a feedback mechanism for the system 100. For example, the computing device 156 may be configured to analyze an amount of the refining agent 102 added to the metal bath 106 via delivery of the cored wire 122.

The computing device 156 may determine whether the wire feed rate (and thus the amount of cored wire 122 and amount of refining agent 102) of the wire feeding subsystem 120 should be increased or decreased. The computing device 156 may calculate a wire feed rate change based on available data. For example, the computing device 156 may calculate a change in wire feed rate based on a desired or optimal amount of cored wire 122 (i.e. refining agent 102) to be added to the unrefined molten metal 108. The computing device 156 may determine the change in wire feed rate using data related to the known composition of the cored wire 122 (i.e. the amount of refining agent per length of cored wire 122).

In some cases, the determination of a wire feed rate change by the computing device 156 may trigger generation and presentation of a message to an operator. The message may be presented via a user interface of the computing device 156. The message may inquire as to whether the wire feed rate should be changed as determined. The computing device 156 may request authorization from the operator to adjust the wire feed rate automatically. In other variations, the computing device 156 may provide a message regarding a wire feed rate change to an operator via the user interface, for manual action by the operator (i.e. the operator manually adjusts the wire feed rate based on the computing device 156 determination using the computing device 156 or other mechanism).

The system 100 may include one or more sensors for providing sensor data to the computing device 156. For example, the sensor may be attached to the vessel 108 and configured to acquire data related to the amount of added refining agent 102 and/or composition of the molten metal. The sensor data may be transmitted to the computing device 156 and used in wire feed rate optimization process by the computing device 156 (i.e. to determine a wire feed rate change).

The computing device 156 may be in communication with one or more components of the system 100, such as the control unit 154. Communication between the computing device and other components may be facilitated by a hard-wire or network connection (wireless or wired). When the computing device 156 determines a wire feed rate change based on a wire feed rate optimization process, the computing device 156 may transmit a signal to the control unit 154 to adjust the wire feed rate according to the output of the optimization. The computing device 156 may transmit the signal automatically or based on an input from the operator.

The system 100 may include a control interface. The control interface may allow an operator to adjust the functioning of one or more components of the system 100, such as the wire feeder unit 124. The control interface may be a physical switch or similar device for manual operation. The control interface may be integrated within a user interface provided via a computing device (e.g. computing device 156).

The system 100 may include a circulation means. The circulation means may be attached to the vessel 104 or may be insertable into the vessel 104. The circulation means is configured to circulate the molten metal of the metal bath 106 and facilitate distribution of the refining agent 102. The circulation means may generate a stirring action. The stirring action may generate improved thermal uniformity and reaction efficiency for the refining agent 102. The circulation means may promote mixing of the molten metal while avoiding vortexing (i.e. apply more mixing energy without vortexing).

In an embodiment, the circulation means may include a spinning nozzle. The spinning nozzle may work with a bottom rib to promote mixing without vortexing, which may lead to improved reduction of impurities 110 by the system 100.

The system 100 includes the cored wire 122. The cored wire 122 includes the refining agent 102.

The cored wire 122 includes a core and an outer sheath material surrounding the core. The outer sheath is composed of a consumable material. The outer sheath of the cored wire 122 may be a tubular wire. The consumable material may be a metal. The metal may be aluminum. The core includes a core fill material including the refining agent 102. The core fill material is coupled to the outer sheath to produce the cored wire 122. The core fill material may be thermocoupled to the outer sheath.

Generally, when the cored wire 122 is added to the unrefined molten metal 108, the outer sheath is consumed by the molten metal and the core fill material, which includes the refining agent 102, is released. The refining agent 102 refines the molten metal by reacting with the molten metal. The refining agent 102 reacting with the molten metal causes the impurities 110 in the molten metal to become removable from the metal bath (i.e. the impurity becomes separate or separable from the molten metal).

The refining agent 102 may enhance degassing when introduced to the unrefined molten metal 108. The refining agent 102 may be particularly beneficial for primary smelters casting aluminum and high-magnesium alloys and secondary smelters casting aluminum and high-silicon alloys. The refining agent 102 may allow achievable sodium levels of less than 1 ppm in high magnesium aluminum alloys.

The refining agent 102 may be a salt. The salt may be a chloride salt. The salt may be a binary salt of (anhydrous) $MgCl_2$ with KCl or NaCl. The refining agent 102 includes an active ingredient. The active ingredient may be $MgCl_2$. The refining agent 102 may be a granular mixture. The refining agent 102 may include other blended salts.

The refining agent 102 may be a fused refining agent, such as a fused salt. The fused refining agent may combine mixtures of potassium chloride and anhydrous magnesium chloride to form a reactive eutectic salt. The fused refining agent may combine mixtures of sodium chloride and anhydrous magnesium chloride to form a reactive eutectic salt. Sodium chloride may be more readily available and less subject to price fluctuations than potassium chloride, and thus may be preferable to use in the refining agent 102.

The refining agent 102 may be a eutectic salt. Eutectic salts are sometimes referred to as "phase changing salts" or phase-changing material. The eutectic salt may form very regular crystalline molecular lattices in the solid phase. The eutectic salt may change phase (melting or solidifying) at varying temperatures: melting at one temperature and solidifying at another. The temperature range between which the melting or solidification occurs may depend on the composition of the eutectic salt.

The fused salt or fused refining agent can be contrasted with a cold blended, non-fused salt. The fused salt may be a eutectic binary salt. The eutectic binary salt melts at a lower temperature than its individual raw components (e.g. NaCl, $MgCl_2$, or KCl salts). For example, while a cold blend of $MgCl_2$ and KCl may melt completely at around 771 C, a fused mixture of the two salts ($KMgCl_3$) may have a melting temperature of 483 C.

The high melt temperature and small sieve sizes of cold blended mixtures may cause floatation and skimming of solid crystals before they are allowed to react. Other cold blended crystals of $MgCl_2$ can stick to stick to furnace walls, causing oxidation and the release of HCl and MgO. A cold-blended salt relies on "finding" all reaction components before it can effectively remove impurities through the described chemical reactions. The refining agent 102 may already have its reaction species fused together and can react as soon as it contacts an inclusive species.

Once the eutectic salt is crushed, one or more other salts may be blended into the crushed eutectic salt. The resulting salt may be considered a tertiary salt or tertiary salt mix. The one or more other salts may include potassium aluminum fluoride (PAF) and/or Aluminum Fluoride (AlF).

In an embodiment, the refining agent 102 may be a binary salt including $MgK_2Cl_4$, $K_3Mg_2Cl_7$. $MgK_2Cl_4$, $K_3Mg_2Cl_7$ may have a melting point of 810 F. $MgK_2Cl_4$, $K_3Mg_2Cl_7$ may have an $MgCl_2$ of 43% and a KCl of 57%.

In another embodiment, the refining agent 102 may be a binary salt including $MgNaCl_3$. $MgNaCl_3$ may have a melting point of 865 F. $MgNaCl_3$ may have a $MgCl_2$ of minimum 55% and a NaCl of maximum 45%.

In another embodiment, the refining agent 102 may be a binary salt including $KMgCl_3$. $KMgCl_3$ may have a melting point of 901 F. $KMgCl_3$ may have a $MgCl_2$ of 60% and a KCl of 40%. The $KMgCl_3$ may include $MgCl_2$ and KCl in any eutectic combination.

In another embodiment, the refining agent 102 may include be a tertiary salt mix. The tertiary salt mix may include a first binary salt (e.g. $KMgCl_3$, $MgNaCl_3$, $MgK_2Cl_4$, $K_3Mg_2Cl_7$) blended with a single salt or second binary salt (e.g. AlF, PAF).

In some cases, the refining agent 102 may be a refining agent used in prior art existing metal treatment systems such as rotor injectors and pump systems.

Advantageously, the system 100 allows the amount of refining agent 102 delivered to the unrefined molten metal 108 to be tightly controlled because the cored wire 122 has a known quantity of refining agent 102 per length of wire and the refining agent 102 has a known composition.

The refining agent 102 is distributed within the metal bath 106. The degree to which the refining agent 102 is distributed may determine how well the refining agent 102 reacts with the molten metal.

The refining agent 102 may have a reaction efficiency. A 100% reaction efficiency indicates that every gram of refining agent 102 has reacted with a proportional weight of impurity (e.g. alkali metal 158) in the melt due to collision and full reaction with the impurity particulates (e.g. alkali particulates).

The impurities 110 may include a dissolved alkali metal 158. The alkali metal 158 may be sodium, calcium, or lithium. When added to the unrefined molten metal 108, the refining agent 102 initiates molecular collisions between the liquid refining agent and the alkali metal 158 (e.g. sodium, lithium and calcium), leading to chemical reactions that consume the alkali metal 158 from the melt. New species are produced via the chemical reactions. The new species are chemically stable in the molten metal and float to the surface. The new species (i.e. impurity) can be skimmed from the surface of the metal bath 106 along with other impurities 110.

Removal of the Alkali metal 158 from the molten metal may include the dissolved alkali metals reacting with Cl (or flux) in the bubbles to form a liquid chloride salt. The liquid chloride salt may be miscible and dispersed in the metal bath 106. The liquid chloride salt is floated out of the metal bath 106 by the bubbles. Liquid salts (e.g. MgCl) if created can carry downstream and cause quality/casting problems. Excess chlorine may also react with Al and Mg present in the molten metal. Cl with Al produces white smoke. Cl with Mg produces $MgCl_2$.

The removal of alkalis 158 from the molten metal occurs based on reactions between the alkalis 158 and the refining agent 102 (i.e. the active ingredient).

In an embodiment, the active ingredient of the refining agent 102 is $MgCl_2$. The reactions including $MgCl_2$ are outlined below:

Thermodynamic properties of each refining agent 102 reaction with alkali metals (Na, Li, Ca) are listed below. A negative change in Gibb's free energy (G), measure in joules, indicates that each reaction is naturally spontaneous at melt temperatures. The largely negative value of the Gibb's free energy change and the largely positive equilibrium constant Keq for the reactions indicate that they are very likely to occur, and that the reverse reactions are very unlikely to occur:

Sodium Reaction with $MgCl_2$:
Sodium Reaction with $MgCl_2$ at 1000 K (727 C):

$\Delta G$ (Joules)=−155062.4 Keq=1.2576E+08
Lithium Reaction with $MgCl_2$:
Lithium Reaction with $MgCl_2$ at 1000 K (727 C):

$\Delta G$ (Joules)=−16290.5 Keq=1.652E+09
Calcium Reaction with $MgCl_2$:
Calcium Reaction with $MgCl_2$ at 1000 K (727 C):

$\Delta G$ (Joules)=−159019.3 Keq=2.0235E+08
The system 100 may reduce alkali metal 158 (Na, Li, Ca) concentrations to acceptable levels. Problems associated with alkali metals include edge cracking, bar/rod breaks, speed cracking, metal sticking at T-plate. The system 100 may be configured to reduce alkali metal 158 concentrations to less than 5 ppm for each alkali and less than or equal to 1 ppm for Na for slab applications.

The impurities 110 may include a non-metallic inclusion 160. The non-metallic inclusion 160 may be a suspended, non-wetted inclusion. The non-metallic inclusion 160 may be an oxide, a carbide, or a boride.

The refining agent 102 may initiate molecular collisions with non-metallic inclusions 160 (oxides, carbides, and borides) or hydrogen cause the inclusion transfer to the liquid refining agent 102 due to the inclusion-concentration differences between the liquid droplet of refining agent 102, inclusions 160 will agglomerate and eventually float to the surface dross layer where the inclusions 160 can be collected. For these reasons, the refining agent 102 may be used to replace directly injection species like chlorine ($Cl_2$) or argon (Ar) when used for inclusion 160 removal.

The system 100 may be designed to achieve a target of greater than 50% removal of non-wetted inclusions 160. With the addition of a small amount of chlorine (less than 1% of the argon process gas flowrate), 50-90% removal of all non-wetted inclusions 160 (e.g. oxide films) is achievable. The system 100 may include or provide results to a downstream filtration operation for best inclusion 160 removal. Without chlorine or flux, removal of inclusions 160 can be highly variable, including as low as 10% removal of all non-wetted inclusions 160 greater than 15 um.

The impurities may include hydrogen gas 162. The hydrogen gas 162 is dissolved in the unrefined molten metal 108. The hydrogen gas 162 may be removed according to a hydrogen degassing process initiated by the refining agent 102. The reduction of hydrogen 162 in the liquid metal may minimize porosity (formation of tiny bubbles of gas in the cast product). The presence of hydrogen 162 can cause problems with the surface quality of the cast produced from the molten metal. The reduction of hydrogen 162 in the liquid metal may increase the mechanical properties of the cast. The reduction of hydrogen 162 in the liquid metal may increase the corrosion resistance of the cast. The reduction of hydrogen 162 in the liquid metal may increase the strength of the cast. The system 100 may operate to reduce the level of hydrogen 162 in the molten metal to a specified target. The target may be 0.10 ml of H/100 g of molten metal (e.g. 0.10 ml of H/100 g of Al).

In some cases, the system 100 may be designed to achieve certain targets for dissolved hydrogen 162. The target may depend on the eventual use. For example, targets may include less than 0.15 ml/100 g Al for extrusion billets and continuous rod, less than 0.12 ml/100 g Al for rolling slabs, and less than 0.10 ml/100 g Al for aerospace aluminum and Al—Li applications.

The system 100 removes hydrogen 162 from the molten metal by introducing the refining agent 102. The refining agent 102 may include an inert gas. The inert gas may be argon. The inert gas may be nitrogen. The refining agent 102 components react with the molten metal (e.g. aluminum) to form a liquid compound including the metal (e.g. aluminum) and the inert gas.

The argon bubbles act as a sink for dissolved hydrogen 162. The bubbles carry the hydrogen 162 to the surface of the molten melt and release the hydrogen into the furnace headspace (the inert atmosphere). The dissolved hydrogen 162 is desorbed into the gas bubble as the bubble rises to the surface of the molten metal. The gas is bubbling and rises through the molten metal. Partial pressure of hydrogen in the formed bubbles is very low. Therefore, the hydrogen 162 diffuses from the molten metal (e.g. aluminum) into the bubbles. The bubbles escape from the metal bath 106 and then gas escapes. The gas may be removed by an exhaust system.

The system 100 may be a proportional removal apparatus. The system 100 may remove a percentage of the incoming inclusions. In some cases, the system 100 may be connected to or otherwise provide output to a filtration stage. The filtration stage may be ceramic foam, deep bed, MCF cartridge, or the like. The filtration stage may be required to meet specific inclusion removal targets as measured by PoDFA or LiMCA.

Figure 2:
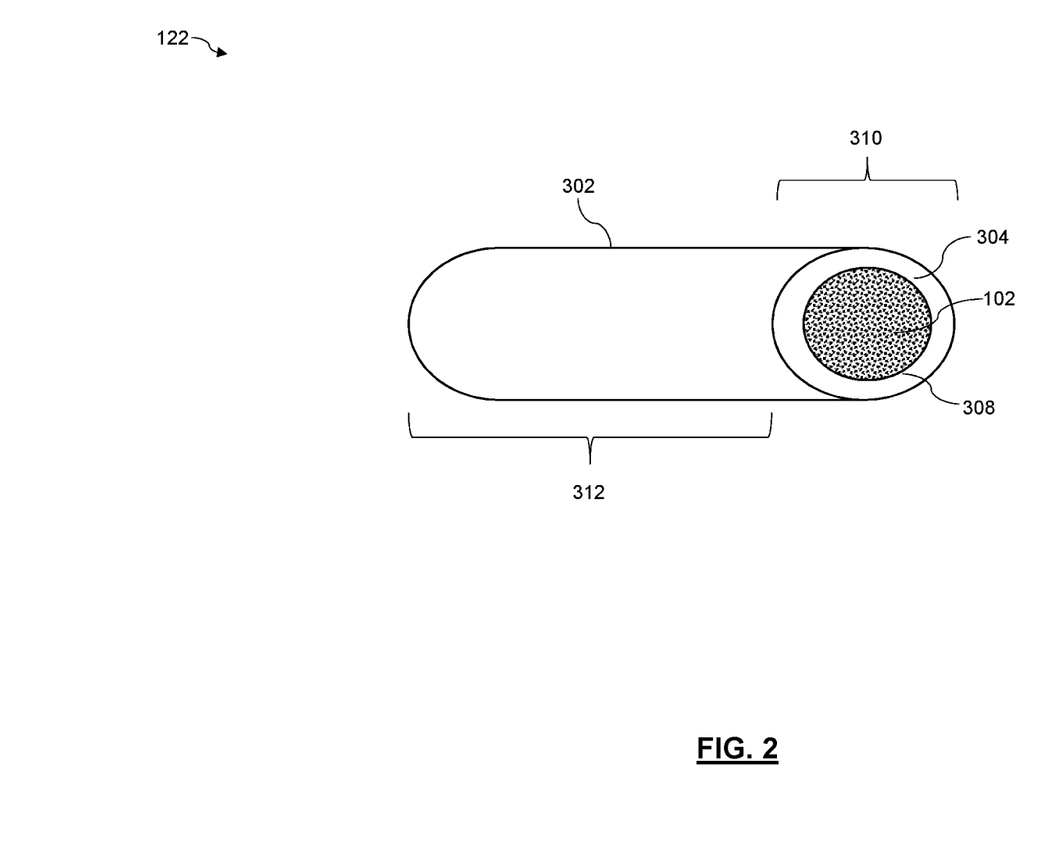
FIG. 2 is a cross-section view of the cored wire shown in FIG. 1, according to an embodiment.

Referring now to FIG. 2, shown therein is a perspective cross-section view of the cored wire 122 of FIG. 1, according to an embodiment.

The cored wire 122 includes an outer sheath material 202. The outer sheath 202 has a tubular cross section 204. The outer sheath material 302 is consumable. The cored wire has a diameter 210 and a length 212. The cored wire 122 may be a single, cylindrical, flexible strand. The cored wire 122 may have a cylindrical cross section.

The cored wire 122 includes a core fill material 208 making up the core of the cored wire 122. The core fill material 208 is coupled to the outer sheath material 202. The core fill material 208 may be thermocoupled to the outer sheath 202. The core fill material 208 includes the refining agent 102.

Upon delivery of the cored wire 122 to the metal bath, the outer sheath 202 is consumed by the molten metal, which releases the core fill material 208 including the refining agent 102. The refining agent 102 reacts with the unrefined molten metal 108.

The refining agent 102 may be a fused refining agent (e.g. fused salt). The core fill material 208 including the fused refining agent 102 may be manufactured by dry mixing the raw materials together. The dry mixture can be fused or melted into a homogeneous liquid state by using a high temperature furnace. Once fusion is complete, the liquid refining agent can be cooled until solid. The fused refining agent may be cooled by chill blocks. Once the fused refining agent is cooled, the cooled fused refining agent 102 can be crushed or ground into particles of a desired granularity. The size of the particles may be designed to suit the intended use of the refining agent 102.

Figure 3:
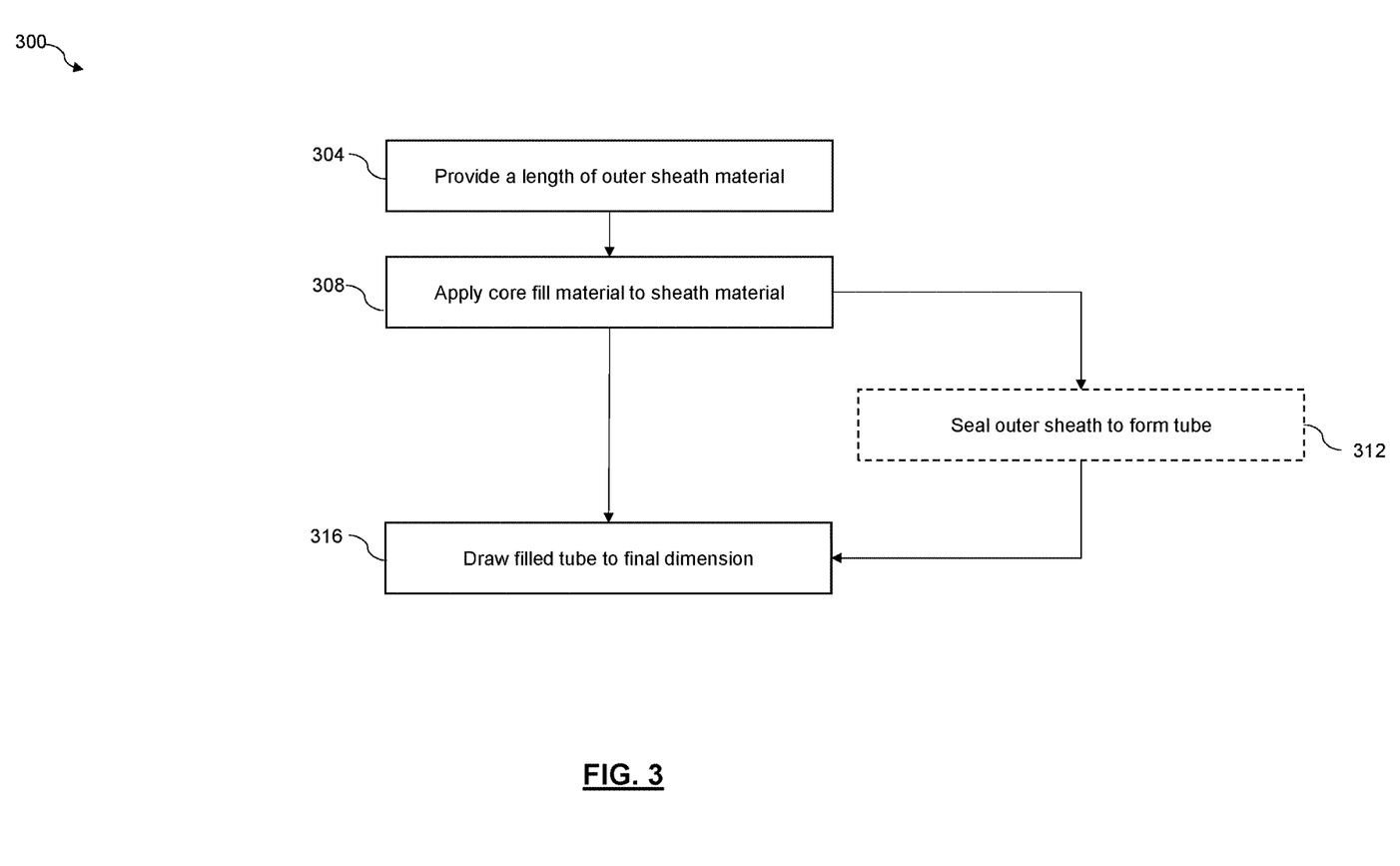
FIG. 3 is a flowchart of a method of manufacturing a cored wire for use in a metal treatment system, according to an embodiment.

Referring now to FIG. 3, shown therein is a flowchart of a method 300 of manufacturing a cored wire for removing impurities in a molten metal (e.g. molten metal of FIG. 1), according to an embodiment. The cored wire can be used in a metal treatment system (e.g. metal treatment system 100 of FIG. 1). The cored wire may be cored wire 122 of FIG. 1.

At 304, a length of outer sheathing material (e.g. outer sheath 202 of FIG. 2) is provided. The outer sheath material is consumable (i.e. consumable by the molten metal). The outer sheath may be a consumable metal. The consumable metal may be aluminum. The consumable material may be selected for a particular application (i.e. particular metal bath to which is will be added). The outer sheath may be any suitable alloy or non-alloy to perform as a consumable filler metal. The raw material/metal stock may be a billet. The billet may be pulled or pushed through several dies to produce wire.

The outer sheath material protects the inner core of the wire (including the refining agent) during delivery or feeding of the cored wire. The cored wire is designed and manufactured such that the cored wire maintains its structure throughout the feeding process (and any prior steps such as transport etc.) and is consumed upon delivery of the cored wire to the metal bath.

The outer sheath may be worked into an appropriate shape for subsequent steps of the method 300. In some cases, the outer sheath may already have a shape suitable to receive the core fill material. The outer sheath material may have a tubular shape or u-shape.

At 308, a core fill material (e.g. core fill material 208 of FIG. 2) is applied to the outer sheath material. The core fill material includes a refining agent (e.g. refining agent 102 of FIG. 1). The refining agent may be a fused refining agent. The core fill material may be a ground or crushed mixture.

At 312, if necessary, the outer sheath is sealed to close the cored wire and form a filled tube. Sealing the outer sheath may not be necessary where the outer sheath material at 304 is provided as or worked into a closed tube.

At 316, the filled tube is formed into a final dimension. The filled tube may be formed into the final dimension using a drawing or extrusion process. Drawing and extruding are metal working processes using tensile forces to change the form of the wire/filled tube by either pulling (draw) or pushing (extrude) the cored wire through a die of a desired cross section to create a cored wire of a fixed cross-sectional profile.

The method 300 may use a rolling or drawing process for working cored wire material (sheath material, sheath material including core fill material, or cored wire) into a desired shape. The material may be worked into a tube shape. The rolling process may include a rolling mill. The rolling process may include passing the material through one or more pairs of rolls to reduce the thickness and to make the thickness uniform.

The cored wire may be drawn in a number of steps by pulling the cored wire through a hole in a die or draw plate as the die is continually reduced in diameter until the correct size is produced.

The drawing may be done at room temperature (i.e. a cold working process). The drawing may be performed at elevated temperatures to hot work large wires and rods or hollow sections in order to reduce forces.

The drawing uses tensile forces to stretch the material of the cored wire. As the cored wire is drawn (pulled), the cored wire stretches thinner, into a desired shape and thickness.

The raw starting material for the cored wire (i.e. the outer sheath material) may be drawn through a die to reduce the diameter and increase the length of the raw material. The drawing may be performed at room temperature (i.e. a cold working process) The drawing may be performed at elevated temperatures to hot work larger cored wires. The die may be mounted on a draw bench. The end of the workpiece may be reduced or pointed to get the end through the die. The end may be placed in grips and the rest of the workpiece pulled through the die.

The drawing process may be used to produce a flexible metal wire (i.e. the cored wire) by drawing the material through a series of dies of decreasing size. The dies may be manufactured from a number of materials, such as tungsten carbide and diamond. A single crystal diamond die may be used for drawing very fine cored wire.

The wire drawing process reduces the cross-section of the cored wire by pulling the cored wire through one or more drawing dies. The cored wire may be prepared by shrinking the beginning of the cored wire, by hammering, filing, rolling or swaging, so that the beginning of the cored wire will fit through the die. The cored wire is pulled through the die. As the cored wire is pulled through the die, the volume of the cored wire remains the same, so as the diameter decreases, the length increases. The cored wire may require more than one draw, through successively smaller dies, to reach the desired size. The American wire gauge scale is based on this. The drawing process may be performed on a small scale with a draw plate, or on a large commercial scale using automated machinery.

For hot drawing, cast-steel dies may be used. For steel wire drawing, a tungsten carbide die may be used. The dies may be placed in a steel casing, which backs the die and allows for easy die changes. Die angles may range from 6–15°. Each die may have at least 2 different angles: an entering angle and an approach angle.

The cored wire may be folded or seamless. The folded cored wire may be more efficient. The seamless cored wire may prevent moisture pickup.

Figure 4:
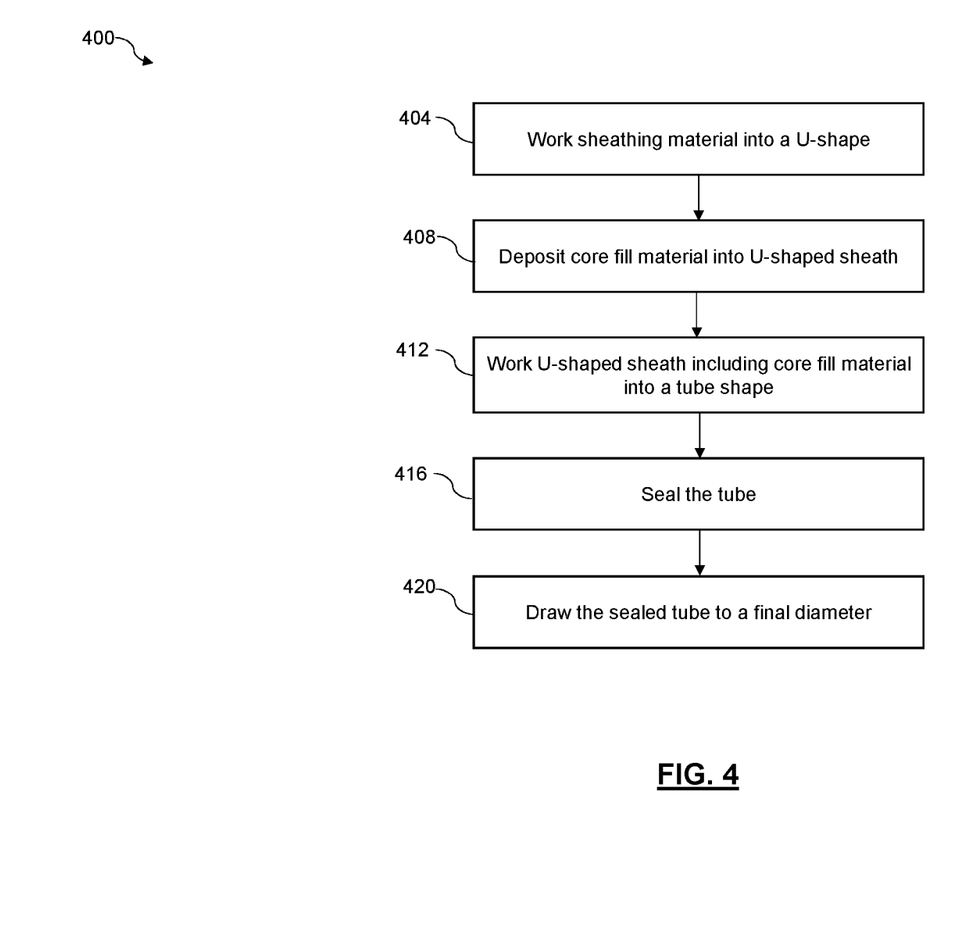
FIG. 4 is a flowchart of a method of manufacturing a folded cored wire for use in a metal treatment system, according to an embodiment.

Referring now to FIG. 4, shown therein is a method 400 of manufacturing a seamed/folded cored wire, according to an embodiment. Method 400 is a variation of the general manufacturing method 300 of FIG. 3. The cored wire is for use in a metal treatment system (e.g. metal treatment system 100 of FIG. 1). The cored wire may be cored wire 122 of FIG. 1.

At 404, a sheathing material (e.g. sheathing material 202 of FIG. 2) is worked into a U-shape (i.e. wire having a U-shape cross-section). The U-shape acts as a reservoir for core fill material (including the refining agent) along the length of the sheathing material. The sheathing material provides an outer layer casing for the cored wire. The U-shape may include a flap at each end of the "U" to assist in facilitating closure of the cored wire.

At 408, a core fill material (e.g. core material 208 of FIG. 2) is deposited into the U-shaped sheath material along the length. The core fill material may be held in a core fill material reservoir. The core fill material includes a refining agent (e.g. refining agent 102 of FIG. 1). To deposit the core fill material, the U-shaped sheathing material may be moved relative core fill material reservoir. Relative movement may be effected by moving the core fill material reservoir, the outer sheathing material, or both. Depositing the core fill material may include a continuous filling of the sheath with a powder mixture. The deposited core fill material may be thermocoupled to the outer sheath.

At 412, the length of U-shaped sheathing material containing the core fill material is worked into a tube shape. Working into a tube shape may include forming a cylinder/tube with the U-shaped sheath material by rolling/folding a first end of the "U" over a second end of the "U" such that the first end overlaps the second end to produce a portion of overlapped sheathing material including material from the first and second ends.

At 416, the cored wire having a tube shape is sealed. Sealing may include sealing overlapped portions of the first and second ends of sheathing material to close the tube. The sealing may include the application of heath to the tube and/or the overlapped portions of sheathing material. The sealing/closing may include the use of rolling equipment.

At 420, the sealed cored wire having a tubular shape is formed/worked to a final dimension. The sealed cored wire may be worked using a drawing and/or rolling process. The cored wire having a final dimension may be wound onto a coil.

Figure 5:
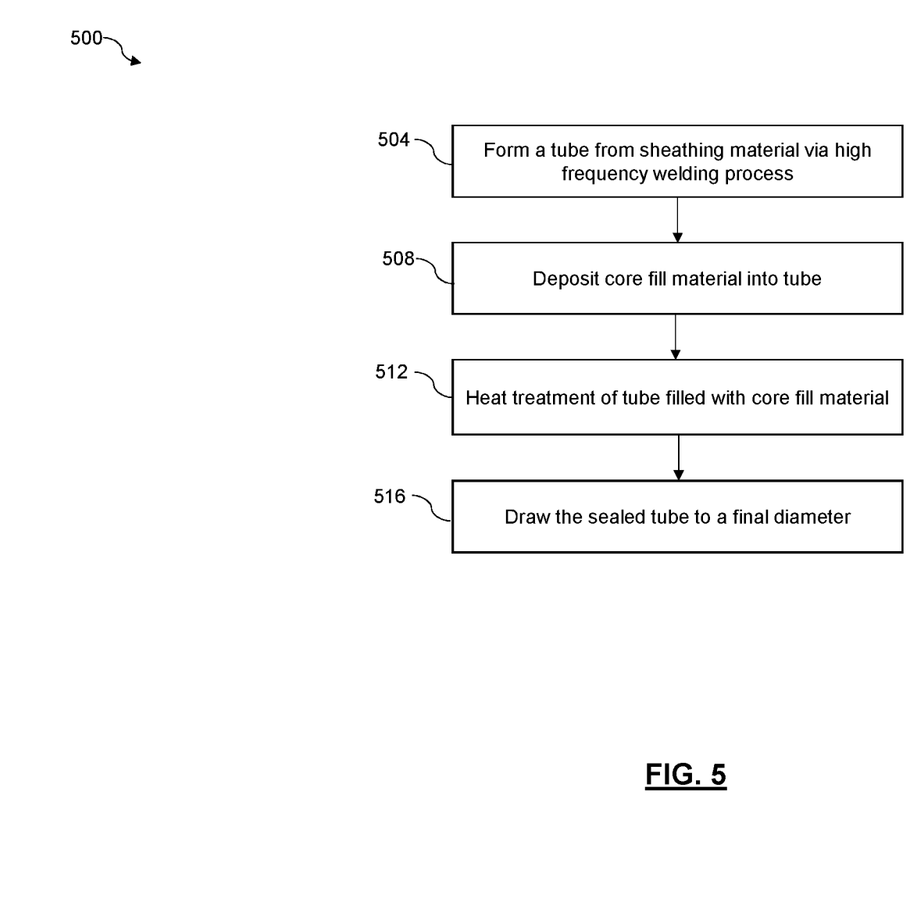
FIG. 5 is a flowchart of a method of manufacturing a seamless cored wire for use in a metal treatment system, according to an embodiment.

Referring now to FIG. 5, shown therein is a flowchart of a method 500 of manufacturing a seamless cored wire, according to an embodiment. Method 500 is a variation of the general manufacturing method 300 of FIG. 3. The cored wire is for use in a metal treatment system (e.g. metal treatment system 100 of FIG. 1). The cored wire may be cored wire 122 of FIG. 1.

At 504, raw material is provided. The raw material will be used as the outer sheath material for the cored wire. The raw material may be a non-alloy strip material. The outer sheath material is formed into a tube shape. The tube-shaped sheath may be formed/produced using a high-frequency welding process.

The inside of the tube-shaped sheath may be cleaned. The tube-shaped sheath may be subjected to heat treatment. Heat treatment may be done in a furnace.

At 508, a core fill material including the refining agent (e.g. refining agent 102 of FIG. 1) is deposited into the tube-shaped outer sheath. The core fill material may be a powder mixture including the refining agent.

The core material may be deposited into the tube using vibration. In an embodiment, a vibrating table may be used to fill the tube with a specified amount of the powder mixture. The filled tube may be pre-drawn to a specified diameter At 512, the tube of outer sheath material containing the core fill material is treated with heat to produce the cored wire. The core fill material may be thermocouple to the outer sheath.

At 516, the cored wire is drawn to a final dimension (diameter). The cored wire may be coated with a material. The cored wire may be wound onto a coil.

While the above description provides examples of one or more apparatus, methods, or systems, it will be appreciated that other apparatus, methods, or systems may be within the scope of the claims as interpreted by one of skill in the art.

The invention claimed is:

1. A cored wire for refining molten aluminum, the cored wire comprising:
   a consumable metal sheath comprising aluminum; and
   a core fill material coupled to an inner surface of the sheath to form the cored wired;
   wherein the cored wire is formed by coupling the core fill material in a solid powdered state to the inner surface of the consumable metal sheath and working the cored wire to decrease the diameter of the cored wire from a first diameter to a second smaller diameter and increase the length of the cored wire;
   wherein the core fill material includes a eutectic refining agent including $MgCl_2$, the eutectic refining agent having a eutectic point lower than the melting point of the molten aluminum; and
   wherein the eutectic refining agent reacts with the molten aluminum when exposed to the molten aluminum when the cored wire is introduced into the molten aluminum, and wherein the reaction caused by the presence of the eutectic refining agent in the molten aluminum separates an impurity from the molten aluminum, such that the impurity can be removed from the molten aluminum.

2. The cored wire of claim 1, wherein the eutectic refining agent is a binary salt comprising $MgCl_2$.

3. The cored wire of claim 1, wherein the eutectic refining agent is a tertiary salt mix.

4. The cored wire of claim 1, wherein the binary salt further comprises KCl or NaCl.

5. The cored wire of claim 1, wherein the tertiary salt mix comprises aluminum fluoride or potassium aluminum fluoride.

6. The cored wire of claim 1, wherein the impurity is at least one of hydrogen gas, a non-metallic inclusion, or an alkali metal.

7. The cored wire of claim 1, wherein the alkali metal is sodium, lithium, or calcium.

8. A wire feeding subsystem adapted to feed the cored wire of claim 1 to the molten aluminum.

9. A metal treatment method comprising:
feeding a cored wire into molten aluminum at a controlled wire feed rate, wherein the cored wire comprises:
a consumable metal sheath comprising aluminum;
a core fill material including a eutectic refining agent having a eutectic point lower than the melting point of the molten aluminum; and
wherein the cored wire is formed by coupling the core fill material in a solid powdered state to the inner surface of the outer sheath and working the cored wire to decrease the diameter of the cored wire from a first diameter to a second smaller diameter and increase the length of the cored wire;
reacting the eutectic refining agent with the molten aluminum;
separating an impurity from the molten aluminum; and
removing the separated impurity from the molten aluminum.

10. The method of claim 9, further comprising monitoring the amount of eutectic refining agent added to the molten aluminum.

11. A system for removing impurities from molten aluminum, the system comprising:
a wire feeding subsystem positioned in-stream on a casting line; and
a cored wire;
wherein the wire feeding subsystem is configured to feed the cored wire into the molten aluminum at a controlled wire feed rate; and
wherein the cored wire comprises:
a consumable outer sheath comprising aluminum; and
a core fill material including a eutectic refining agent including $MgCl_2$, the eutectic refining agent having a eutectic point lower than the melting point of the molten aluminum, wherein the eutectic refining agent reacts with the molten aluminum when exposed to the molten aluminum when the cored wire is introduced into the molten aluminum; and
wherein the cored wire is formed by coupling the core fill material in a solid powdered state to the inner surface of the outer sheath and working the cored wire to decrease the diameter of the cored wire from a first diameter to a second smaller diameter and increase the length of the cored wire; and
wherein the reaction caused by the presence of the eutectic refining agent in the molten aluminum separates an impurity from the molten aluminum, such that the separated impurity can be removed from the molten aluminum.

12. The system of claim 11, wherein the eutectic refining agent is a binary salt comprising $MgCl_2$.

13. The system of claim 12, wherein the binary salt further comprises KCl or NaCl.

14. The system of claim 11, wherein the eutectic refining agent is a tertiary salt mix.

15. The system of claim 14, wherein the tertiary salt mix comprises aluminum fluoride or potassium aluminum fluoride.

16. The system of claim 11, wherein the impurity is at least one of hydrogen gas, a non-metallic inclusion, or an alkali metal.

17. The system of claim 16, wherein the non-metallic inclusion is an oxide, a boride, or a carbide.

18. The system of claim 16, wherein the alkali metal is sodium, lithium, or calcium.

19. The system of claim 11, wherein the cored wire has a known composition including an amount of refining agent per length of cored wire, and wherein the wire feeding subsystem is configured to determine the wire feed rate from the known composition of the cored wire and a target amount of refining agent and feed the cored wire into the molten aluminum at the determined wire feed rate.

20. The system of claim 19, wherein the wire feeding subsystem includes a computing device configured to:
store the known composition of the cored wire and the target amount of refining agent; and
determine the wire feed rate from the known composition of the cored wire and the target amount of refining agent.

21. The system of claim 20, wherein the wire feeding subsystem further comprises a wire feeder unit communicatively connected to the computing device, and wherein the wire feeder unit is configured to:
receive a wire feed signal from the computing device, the wire feed signal indicating the determined wire feed rate; and
feed the cored wire into the molten aluminum at the determined wire feed rate.

* * * * *